Patented Oct. 18, 1949

2,485,116

UNITED STATES PATENT OFFICE 2,485,116

SYNTHESIS OF DL-METHIONINE

Kenneth Savard, Montreal, Quebec, Canada, assignor, by mesne assignments, to Ayerst, McKenna & Harrison Limited, New York, N. Y., a corporation of New York No Drawing. Application July 10, 1947, Serial No. 760,121. In Canada May 28, 1947

2 Claims. (Cl. 260—534)

Introduction

This invention relates to the preparation of dl-methionine.

The present methods for synthesizing this amino acid are methods applying in general to amino acids and, as a result, their specific application to methionine has certain disadvantages, as for instance, low yields and lengthy procedures which are not commercially feasible.

Objects

Having regard to the foregoing, it is a principal object of the invention to provide a more convenient method for synthesizing the compound. Further objects are to provide a method of this nature wherein the end product is recovered in a high yield in pure form.

Preferred procedure

In accordance with a specific embodiment of the invention, the applicant proceeds as follows, the bracketed reference letters referring to the compounds indicated, and the bracketed numerals to the steps in the procedure.

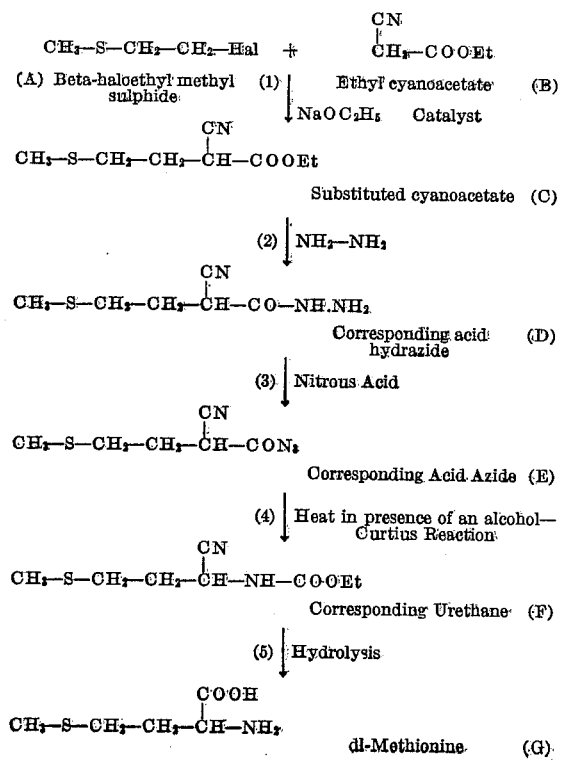

As will be evident from this procedure, a halide derivative of beta-hydroxyethyl methyl sulphide (A) is condensed with an alkali metal derivative of a lower alkyl ester of alpha-cyano acetic acid (B) to form the corresponding lower alkyl ester of alpha-cyano-gamma-methylthiolbutyric acid (C). The alkyl ester is converted to alpha-cyano-gamma-methylthiolbutyric acid hydrazide (D). The latter is transformed to alpha-cyano-gamma-methylthiolbutyric acid azide (E). The azide is transformed by means of the Curtius reaction to the substituted urethane, a lower alkyl ester of N-(1-cyano-3-methylthiol-propyl) carbamic acid (F) from which dl-methionine (G) is derived by hydrolysis.

Process conditions

In order to describe the procedure more fully, reference will now be made to the process conditions which the applicant prefers to employ in the respective steps.

*Step 1.*—In the condensation step, there is prepared a suitable solvent medium, preferably anhydrous, for example, ethyl alcohol to which an alkali metal, for example, sodium is added. Compound (B) is then added followed by compound (A). Optionally, a yield-increasing agent, for example, the iodide of potassium or sodium can be added. The reaction mixture is heated until the condensation is complete. The reaction mixture is treated to permit the isolation of compound (C). As compound (B) the lower alkyl esters having not more than five carbon atoms are preferred, particularly the methyl and ethyl. As compound (A) the chloride, bromide or iodide can be employed, with the chloride preferred.

*Step 2.*—This step involves treatment of compound (C) with hydrazine as such, or in the form of its hydrate. The reaction is performed at room or moderately elevated temperature in the absence of a solvent, or in the presence of an inert solvent, for example, an alcohol or a hydrocarbon, e. g. benzene.

Alternatively, one may proceed from (C) through the corresponding acid halide by the same reaction with hydrazine or a derivative.

*Step 3.*—This step involves reaction of (D) in aqueous solution, below about 10° C. with nitrous acid and extracting from the resulting solution the compound (E) by means of a water-immiscible neutral organic solvent, e. g. ether.

Alternatively to steps 2 and 3 as outlined, one may proceed from (C) through the corresponding acid halide by means of a derivative of hydrazoic acid. This is effected by removing the OEt group and replacing it with a halide. This can be done by reacting with a halogenating agent, for example thionyl chloride or phosphorus pentachloride (PCl₅). The resulting compound is then reacted with a salt of hydrazoic acid as for example sodium or potassium azide, so as to replace the chlorine group with the azide group.

*Step 4.*—Compound (E) is decomposed by heating in an anhydrous medium consisting of a solvent such as alcohol which will permit the formation of compound (F). Conditions which will bring about the Curtius rearrangement (see Hackh's Chemical Dictionary, 3rd edition, 1944) are employed, e. g. refluxing an alcohol solution of the azide (E) in which the latter decomposes, with loss of nitrogen; once (E) has decomposed, the alcohol acts on the resulting intermediate giving rise to the corresponding carbamic acid derivative (urethane). The excess of solvent may be removed by evaporation. The alcohols preferred are lower alcohols not having more than five carbon atoms, particularly methyl alcohol and ethyl alcohol.

*Step 5.*—The conditions of this step are those of hydrolysis which may be brought about by the action of acids or alkalis or by the procedure known as the "imino-ether" method. The product dl-methionine is then separated from the reaction mixture by known methods. The preferred conditions of hydrolysis consist of a hydrolysis mixture made up of concentrated hydrochloric acid, formic acid and water in equal parts. The hydrolysis is preferably carried out at reflux temperature for a period of time up to 24 hours, preferably from 4 to 8 hours. The longer periods of refluxing result in destruction as evidenced by lower yields of the amino acid.

The invention consists in certain steps and combinations of steps selected from this procedure, and in products resulting from these steps, as will be evident from the disclosure and qualifying claims.

EXAMPLES

In order to explain the invention more specifically, particular examples are given as follows. It will, of course, be understood that the data given is illustrative only.

EXAMPLE 1

*Preparation of ethyl alpha-cyano-gamma-methylthiolbutyrate*

A sodium derivative of ethyl cyanoacetate was formed by dissolving 13.8 g. (0.6 mole) of sodium metal in 400 ml. of absolute ethanol and adding 135.6 g. (1.2 moles) of freshly distilled ethyl cyanoacetate. After stirring, the solution, 66.0 g. (0.6 mole) of beta-chloroethyl methyl sulphide followed by 2.0 g. of potassium iodide were added, and the mixture refluxed gently for 12 hours. The excess ethanol was removed by distillation and the residue then poured into 500 ml. of cold water with stirring, the pH being maintained at about 7. The oil which separated was removed by extraction of the aqueous mixture with ether or benzene and the extracts combined and dried over anhydrous sodium sulphate. After removal of the solvent, the dark residue was distilled, yielding ethyl alpha-cyano-gamma-methylthiolbutyrate.

Analysis: Calculated for $C_8H_{13}O_2NS$; N, 7.53; S. 17.22%. Found N. 7.53; S, 17.10%.

EXAMPLE 2

*Preparation of alpha-cyano-gamma-methylthiol butyric acid hydrazide*

9.3 g. (0.05 mole) of ethyl alpha-cyano-gamma-methylthiolbutyrate and 3.0 g. (0.05 mole) of 85% hydrazine hydrate solution were mixed in a beaker. After several minutes of vigorous scratching with a glass rod, an exothermic reaction occurred. Solvents were removed in a vacuum desiccator. The hydrazide was a liquid at room temperature. Alpha-cyano-gamma-methylthiolbutyric acid hydrazide was identified by reaction with anisaldehyde in the usual way. The resulting condensation product, anisal alpha-cyano-gamma-methylthiolbutyric acid hydrazide, after recrystallization from methyl alcohol melted at 136 to 137° C.

Analysis: Calculated for $C_{14}H_{17}O_2N_3S$: N. 14.43; S, 11.01%. Found: N, 14.17; S, 11.01%.

EXAMPLE 3

*Preparation of alpha-cyano-gamma-methylthiol-butyric acid azide*

8.8 g. of the crude hydrazide as prepared in Example 2 were dissolved in a mixture of 140 ml. of water and 40 ml. of concentrated hydrochloric acid. The aqueous solution was cooled to 0° C., covered with 100 ml. of ether and, with stirring, a cooled solution of 6.0 g. of sodium nitrite in 60 ml. of water was added slowly. The ether layer was separated and the aqueous solution rapidly extracted with ether. The combined ether extracts were quickly dried over anhydrous sodium sulphate. The ethereal solution of alpha-cyano-gamma-methylthiolbutyric acid azide so obtained is used without further treatment.

EXAMPLE 4

*Preparation of ethyl N-(1-cyano-3-methylthiol-propyl)-carbamate*

To the solution of the azide obtained in Example 3 about 100 ml. of absolute ethyl alcohol was added. The solution was heated on a water bath until all the ether was removed, and then allowed to reflux for one hour, after which the alcohol was removed under reduced pressure. The dry ethyl ester of N-(1-cyano-3-methylthiol-propyl) carbamic acid was an oil which did not crystallize.

EXAMPLE 5

*Hydrolysis to form dl-methionine*

4.3 g. of the urethane resulting from Example 4, and 60 ml. of a mixture of concentrated hydrochloric acid, 85% formic acid solution and water (in the ratio of 1:1:1) were refluxed for 6 hours thereby forming dl-methionine.

When cool, the solution was worked up by filtration, evaporation to dryness under reduced pressure, followed by dissolving the residue in distilled water and again evaporating to dryness, these operations being repeated until all the excess hydrochloric acid had been removed. The dark residue resulting was dissolved in water and the solution treated with activated carbon. The pH was adjusted to approximately 5.9 and the solution evaporated to dryness under reduced pressure. The residue was dissolved in a minimum volume of boiling water, three volumes of ethanol were added and the solution allowed to cool overnight, and the resulting crystals filtered. Recrystallization of the crude product from 50% ethanol gave pure dl-methionine.

Analysis: Calculated for $C_5H_{11}O_2NS$; N, 9.39; S, 21.49%. Found N, 9.31; S, 21.23%.

The hydrolysis of the urethane obtained in Example 4 was also accomplished by heating with 20% hydrochloric acid, alcoholic sodium hydroxide, or aqueous barium hydroxide. A further method, the imino-ether method, consisting of the treatment of the alcoholic solution of the urethane with dry hydrogen chloride gas in the cold, evaporation of the solution and mild hydrolysis of the resulting imino ether compound also yielded the product.

The yields of dl-methionine, calculated from the ethyl alpha-cyano-gamma-methylthiolbutyrate, are given in the following table.

| Hydrolysis medium | Overall yield Per cent |
|---|---|
| Hydrolchloric acid | 15 |
| Sodium hydroxide (alcoholic) | 45 |
| Barium hydroxide | 12 |
| Imino-ether method | 26 |
| Hydrochloric-formic acid | 58 to 73 |

*Advantages*

The advantages of this synthesis are that it does away with complex procedures which are not commercially expedient and provides a process giving high yields.

It will be understood that the above embodiments are preferred and given for the purpose of illustration. Therefore, various other modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

I claim:

1. In the synthesis of methionine the step of hydrolyzing ethyl N-(1-cyano-3-methylthiolpropyl) carbamate by refluxing the said carbamate in an aqueous medium consisting essentially of hydrochloric acid, formic acid and water, and recovering methionine therefrom.

2. The step defined in claim 1 in which the aqueous medium consists of concentrated hydrochloric acid, 85% formic acid and water in substantially equal amounts.

KENNETH SAVARD.

REFERENCES CITED

The following references are of record in the file of this patent:

UNITED STATES PATENTS

| Number | Name | Date |
|---|---|---|
| 1,620,714 | Bergeim | Mar. 15, 1927 |
| 2,380,062 | Mowry | July 10, 1945 |
| 2,426,158 | Bahner | Aug. 26, 1947 |
| 2,432,478 | Lecky | Dec. 9, 1947 |

OTHER REFERENCES

Sah, J. Chinese Chem. Soc., vol. 4, pages 198–207 (1936).

Darapsky et al., J. Parkt. Chem., (2) vol. 146, pages 250–267 (1936).

Gagnon et al., J. Chem. Soc., vol. 1944, pages 13–15 (1944).

Block, "Chemical Reviews," vol. 38 (June 1946), page 547.